United States Patent [19]

Loghmani et al.

[11] Patent Number: 5,778,059
[45] Date of Patent: Jul. 7, 1998

[54] DISTRIBUTED PREDICTIVE AND EVENT-DRIVEN PROCESSING ENVIRONMENT

[75] Inventors: Masoud Loghmani; Steven Davis, both of Columbia; Brian Bolon, Ellicott City, all of Md.

[73] Assignee: Digital Technics, Inc., Columbia, Md.

[21] Appl. No.: 706,221

[22] Filed: Aug. 30, 1996

[51] Int. Cl.$^6$ .................................................. H04M 3/42
[52] U.S. Cl. .......................... 379/243; 379/201; 395/671
[58] Field of Search .......................... 379/201, 219, 379/242, 243, 244, 245, 246, 207, 111, 283; 395/701, 702, 703, 611, 682, 680, 681, 683, 670, 671, 200.53, 200.54, 200.55, 200.56

[56] References Cited

U.S. PATENT DOCUMENTS

| | | | |
|---|---|---|---|
| 5,117,372 | 5/1992 | Petty | 345/335 |
| 5,247,651 | 9/1993 | Clarisse | 395/500 |
| 5,291,479 | 3/1994 | Vaziri et al. | 370/264 |
| 5,384,823 | 1/1995 | Brenski et al. | 379/10 |
| 5,386,464 | 1/1995 | Pruitt | 379/201 |
| 5,388,258 | 2/1995 | Larsson et al. | 707/104 |
| 5,404,396 | 4/1995 | Brennan | 379/201 |
| 5,426,694 | 6/1995 | Hebert | 379/242 |
| 5,455,854 | 10/1995 | Dilts et al. | 379/201 |
| 5,546,453 | 8/1996 | Hebert | 379/242 |
| 5,590,187 | 12/1996 | Greenspan | 379/201 |
| 5,627,888 | 5/1997 | Croughan-Peeren | 379/201 |
| 5,655,014 | 8/1997 | Walsh et al. | 379/242 |
| 5,655,015 | 8/1997 | Walsh et al. | 379/242 |

OTHER PUBLICATIONS

M. Pietrek, "Inside the Windows Messaging System: Opening Up the Heart of Windows", Dr. Dobb's Journal, M&T Publishing Inc., v18 n2 p. 72 (8), Feb. 1993.

*Primary Examiner*—Krista Zele
*Assistant Examiner*—Scott Wolinsky
*Attorney, Agent, or Firm*—Roylance, Abrams, Berdo & Goodman, L.L.P.

[57] ABSTRACT

A distributed, predictive, event-driven processing environment is provided for controlling a number of elements characterized by different states and events. Transitions between states are reflected by predictive, event-driven, independent functions provided in the action subroutines and do not require state searches associated with fixed state machines. Action subroutines can be grouped together in various service groups which require similar event processing. Service groups are invoked by an action subroutine manager which can also access a application programming interface set. Processing of different elements can be spread across multiple processors or a single processor with the action subroutines having no knowledge of the number of processors.

11 Claims, 7 Drawing Sheets

| | SEIZURE | RELEASE | TIMEOUT | ANSWER | DIGIT |
|---|---|---|---|---|---|
| TRUNK IDLE | SUBR "A" | | | | |
| AWAIT BSY | | | | | |
| TRK SZR WT | | | | | |
| AWAIT DIGS | | | | | SUBR "B" |
| BUSY FILTER | | | | | |
| AWAIT WINK | | | | | |
| TALKING T-T | | SUBR "C" | | | |
| AWAIT ANS | | | | SUBR "D" | |
| HUNT RETRY | | | | | |
| WINK ST DLY | | | | | |
| RLSE TRUNK | | | | | |
| WNK END DLY | | | | | |
| TRUNK DISC | | | | | |
| TONE | | | | | |
| AWAIT MF SZ | | | | | |
| DISC GUARD | | | | | |
| AWAIT RING | | | | | |
| AWAIT ACK | | | | | |
| SEND DIGITS | | | | | |
| BUSY FLASH | | | | | |

| EVENT \ STATE | OUT OF SERVICE LE0 | NULL LE1 | PATH INITIATED BY LE LE2 | PATH INITIATED BY AN LE3 |
|---|---|---|---|---|
| FE-protocol_parameter_request (NOTE 8) | — | — | — | — |
| FE-disconnect_request | — | / | stop timers, DISC., start T3; LE5 | stop timers, DISC., start T3; LE5 |
| FE-disconnect_complete_request | / | / | / | DISC. COMPLETE; LE1 |
| MDU-CTRL (port blocked) | LE6 | stop timers, DISC. COMPLETE, FE-disc._complete_ind.; LE6 | stop timers, DISC. COMPLETE, FE-disc._complete_ind.; LE6 | stop timers, DISC. COMPLETE, FE-disc._complete_ind.; LE6 |
| MDU-CTRL (port unblocked) | — | — | — | — |
| MDU-CTRL (restart request) | MDU-CTRL(restart ack); — | DISC. COMPLETE, FE-disc._complete, MDU-CTRL(restart ack); LE0 | DISC. COMPLETE, FE-disc._complete, MDU-CTRL(restart ack); LE0 | DISC. COMPLETE, FE-disc._complete, MDU-CTRL(restart ack); LE0 |

*FIG. 3A*
*PRIOR ART*

| STATE<br>EVENT | PATH ACTIVE<br>LE4 | PATH DISCONNECT REQUEST<br>LE5 | PORT BLOCKED<br>LE6 |
|---|---|---|---|
| FE-protocol_parameter_request (NOTE 8) | PROTOCOL PARAMETER, start T1; –<br><br>PROTOCOL PARAMETER, stop timers, MDU-error_ind.; DISC., start T3; LE5 | – | LE6 / |
| FE-disconnect_request | stop timers, DISC., start T3; LE5 | / | / |
| FE-disconnect_complete_request | – | – | – |
| MDU-CTRL, (port blocked) | stop timers, DISC. COMPLETE, FE-disc._complete_ind.; LE6 | stop timers, DISC. COMPLETE, FE-disc._complete_ind.; LE6 | – |
| MDU-CTRL, (port unblocked) | – | – | LE1 |
| MDU-CTRL, (restart request) | DISC. COMPLETE, FE-disc._complete, MDU-CTRL(restart ack); LE0 | DISC. COMPLETE, FE-disc._complete, MDU-CTRL(restart ack); LE0 | MDU-CTRL(restart ack); – |

*FIG. 3B*
*PRIOR ART*

| STATE<br>EVENT | OUT OF SERVICE<br>LE0 | NULL<br>LE1 | PATH INITIATED BY LE<br>LE2 | PATH INITIATED BY AN<br>LE3 |
|---|---|---|---|---|
| MDU-CTRL, (restart complete) | LE1 | / | / | – |
| timeout T1 (NOTE 5) | / | / | ESTABLISH, start T1; –<br>start T3, DISC.,<br>MDU-error_ind., LE5 | / |
| timeout T3 (NOTE 4) | / | / | / | / |
| timeout T4 (NOTE 12) | STATUS ENQUIRY, start T4; –<br>MDU-error_ind.; – | STATUS ENQUIRY, start T4; –<br>stop all timers, MDU-error_ind.;<br>DISC., start T3; LE5 | STATUS ENQUIRY, start T4; –<br>stop all timers, MDU-error_ind.;<br>DISC., start T3; LE5 | STATUS ENQUIRY, start T4; –<br>stop all timers, MDU-error_ind.;<br>DISC., start T3; LE5 |
| timeout Tr | / | / | / | / |
| timeout Tt | / | / | / | / |

*FIG. 3C*
*PRIOR ART*

| EVENT \ STATE | PATH ACTIVE LE4 | PATH DISCONNECT REQUEST LE5 | PORT BLOCKED LE6 |
|---|---|---|---|
| MDU-CTRL, (restart complete) | – | – | – |
| timeout T1 (NOTE 5) | / | / | / |
| timeout T3 (NOTE 4) | / | DISC., start T3; – / MDU-error_ind.; LE1 | / |
| timeout T4 (NOTE 12) | STATUS ENQUIRY, start T4; – / stop all timers, MDU-error_ind.; DISC., start T3; LE5 | / | STATUS ENQUIRY, start T4; – / MDU-error_ind; – |
| timeout Tr | SIGNAL ACK; – | / | / |
| timeout Tt | stop timers, MDU-error_ind.; DISCONNECT, start T3, LE5 | / | / |

DISTRIBUTED PREDICTIVE AND EVENT-DRIVEN PROCESSING ENVIRONMENT

FIELD OF THE INVENTION

The invention relates to an embedded, event-driven programming platform for a control environment characterized by real-time or pseudo-real-time events generated by independent entities.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyrights whatsoever.

BACKGROUND OF THE INVENTION

Finite state machines are frequently used to control devices in a complex control environment such as a smart building or a telecommunications switching device. In a smart building, a number of different sensors for temperature, humidity, ambient light, occupancy and the like generate a number of different events which affect how devices such as HVAC, lighting and security systems are controlled. Similarly, a telecommunications switching device provides a number of different services or features to various subscriber units and circuits (e.g., ports, trunks, lines, and so on), which operate in various call processing states precipitated by various events.

Figure 1:
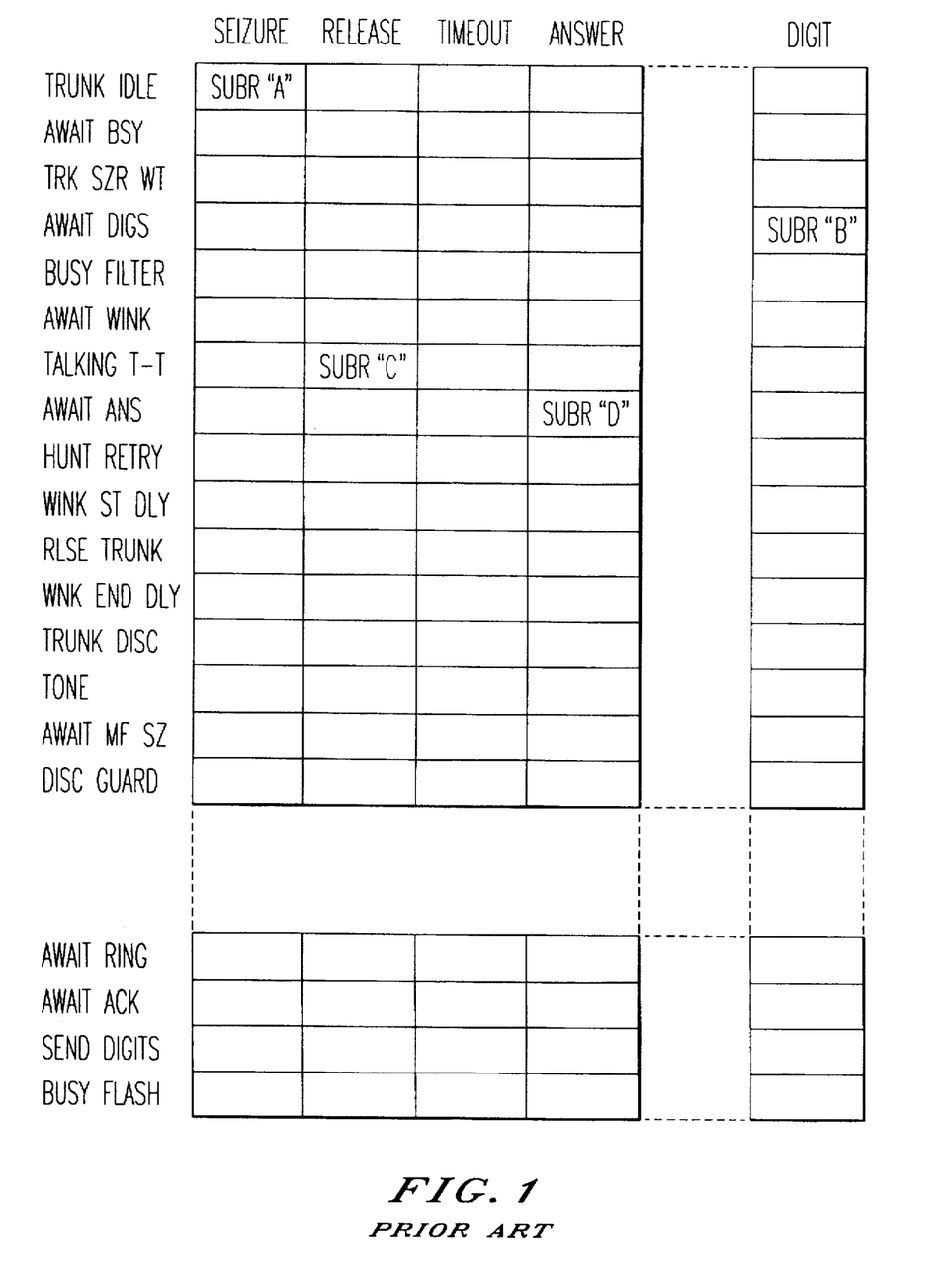
FIG. 1 is a diagram illustrating a state transition table employed in a fixed state machine in accordance with the prior art.

For example, a time division multiplex (TDM) switching system comprising trunk circuits and a time slot interchange is generally controlled by a processor and a memory device. The processor and the memory device constitute a state machine. Tables in the memory device constitute a matrix for states in which the circuits are to be placed in response to events that can occur. A portion of a table is illustrated in FIG. 1. During operation, the processor accesses various states, which are represented by the row headers in FIG. 1, in accordance with events taking place on the trunks such as seizures, releases, timeouts and other events, which are represented by the column headers. In other words, the processor performs a search of each all of these states and all of these events to locate a subroutine necessary to handle the current event/state combination. At the intersection of a column and a row in the table depicted in FIG. 1 is the memory address of a subroutine responsible for processing that particular state/event combination. Some state machines can index into a two-dimensional matrix of events and states; however, these state machines are simple and contain a limited number of states and events.

Programming these complex control systems is an expensive and time-consuming task because, in addition to their multithreading and distributed processing requirements, these systems need to provide interaction among features and services, as well as fulfill an increasing industry demand for network transparency (i.e., a feature developed for one node operates on all nodes in a network). In a telecommunications switch, for example, multiple, sophisticated features are provided to subscribers with simple interfaces such as dial pulse telephones which have little or no call processing capability. Due to the limitations of the interface, a relatively extensive amount of interaction is required among the respective program code modules that implement different features. Thus, adding a new call processing feature renders a significant number of existing features and, accordingly, existing program code modules nonoperative.

By way of an example, if a new service is desired for the state machine represented in FIG. 1, multiple, new states and events must be created. The new states impact the existing code, which must take the new states into account. The subroutines, therefore, become longer and more complicated. Further, the program code generally must be recompiled. As the number of rows and/or columns grows, as well as the length of the various subroutines, the event and state searches become more burdensome on the call processing engine associated with the telecommunications switch.

Another fixed, table-based state machine for a stored program controlled telecommunications switch is disclosed in U.S. Pat. No. 5,386,464. The system allows for some degree of flexibility and reduction in development time for expansion of program code to implement new features and without requiring recompiling of the code. The feature program, however, is required to access three different tables when processing each new event.

An event and task table is stored as a data array which represents different events which precipitate changes from one state to the next state. A feature program for a telecommunications switch accesses the event and task table in response to an event and, based on the current state, determines a task number. The task number corresponds to a list of tasks required to effectuate the state change. The list of tasks is specified in another table which identifies how many tasks and which tasks are associated with a particular task number. Once each task in the list of tasks is completely executed, the feature program performs a look-up operation using another table, that is, a next state table to obtain the next state. Thus, each feature is associated with three separate tables. In addition to increasing kernel processing time, each of the tables require modification when new features are added, thereby increasing development time. A need therefore exists for a processing environment for complex programmed control systems which facilitates the addition of new programmed features.

SUMMARY OF THE INVENTION

In accordance with an embodiment of the present invention, a distributed predictive, event-driven processing environment is provided for controlling a number of elements in a control system which are characterized by different states and events. A single table is used to correlate an event to one or a series of action subroutines. The contents of the table are dynamic in that they are modified as events are processed. When an event arrives, the table is accessed to locate the series of action subroutines which correspond to that event without ascertaining the state of the element. The state information is implied by the action subroutines that are linked to that event.

In accordance with another aspect of the present invention, the content of the table is modified as the action subroutines change the state of that element. The action subroutines predict the next event or series of events and how these event(s) are to be processed and modify the table accordingly.

In accordance with yet another aspect of the present invention, action subroutines can be grouped together as service groups that are invoked by an action subroutine manager.

In accordance with another aspect of the present invention, the action subroutines are created from the viewpoint of a single element (e.g., subscriber in a telecommunications system). Since no assumptions are made as to the ability to access a global profile database, an action subroutine created for a single node in the system can also operate across several nodes.

BRIEF DESCRIPTION OF THE DRAWINGS

These and other features and advantages of the present invention will be more readily apprehended from the following detailed description when read in connection with the appended drawings, which form a part of this original disclosure, and wherein.

DETAILED DESCRIPTION OF THE PREFERRED EMBODIMENT

For illustrative purposes, the software architecture and embedded processing environment of the present invention will be described in connection with a telecommunications switching platform. It is to be understood, however, that the software architecture and embedded processing environment of the present invention is useful with substantially any hardware platform requiring programmed control such as a smart building, as stated previously, and a manufacturing plant, among other platforms and applications.

A telecommunications switching platform such as the system described in U.S. Pat. No. 5,291,479, which issued Mar. 1, 1994 to Faramarz Vaziri, Brian Bolon, Brent E. Bryson and John Emerick and assigned to Digital Technics, Inc., represents a distributed control environment. The platform comprises at least one shelf containing a number of boards, including a central processing unit or master control unit (MCU) board and one or more peripheral boards (e.g., an analog board for processing two-wire subscriber lines, and digital boards such as E1 and T1 trunk boards, among others). Each shelf has fully independent resources for all connections within that shelf and for setting up connections between shelf ports and with ports on other shelves.

Figure 2:
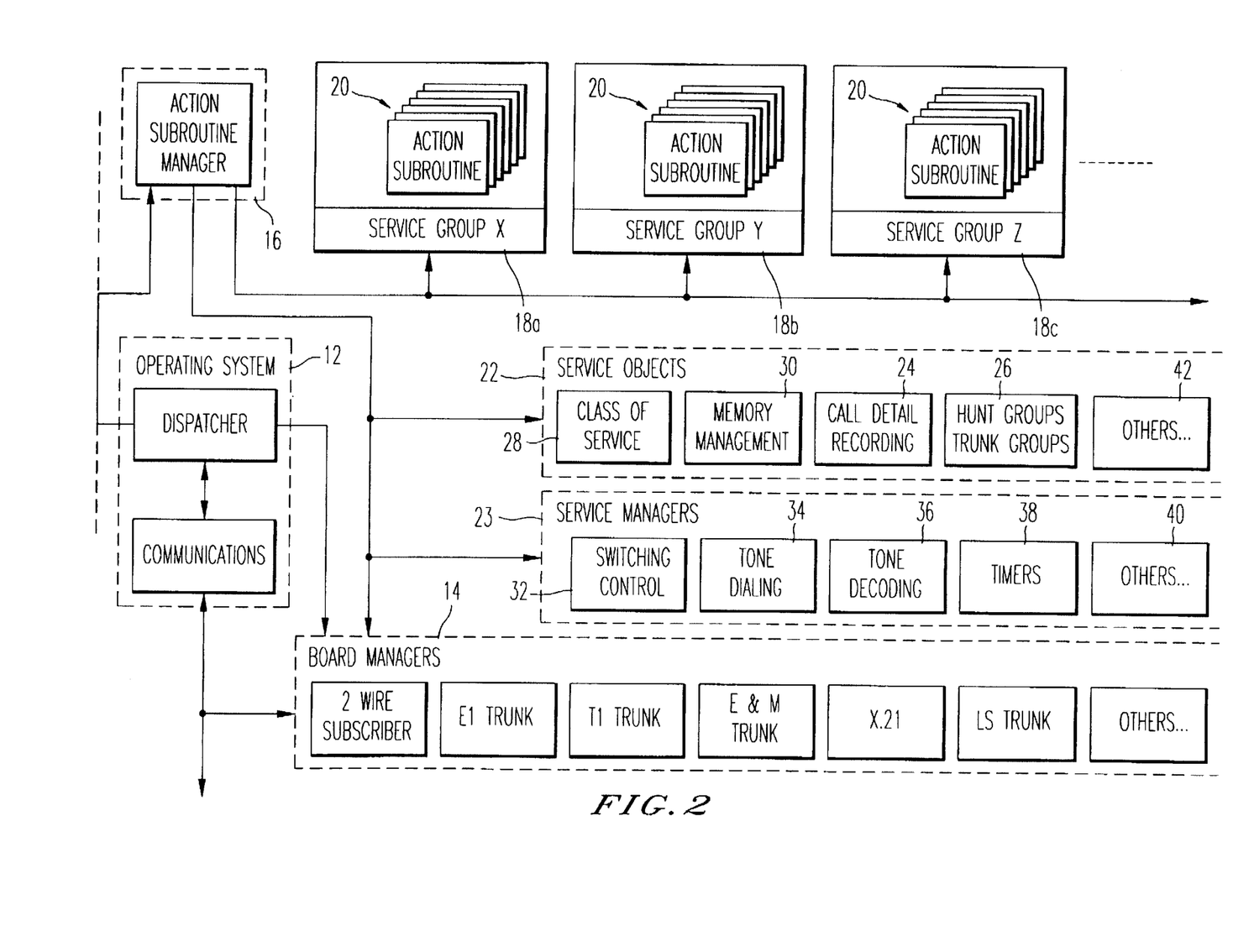
FIG. 2 is a block diagram of the software elements of a telecommunications system in accordance with an embodiment of the present invention.
Figure 3A:
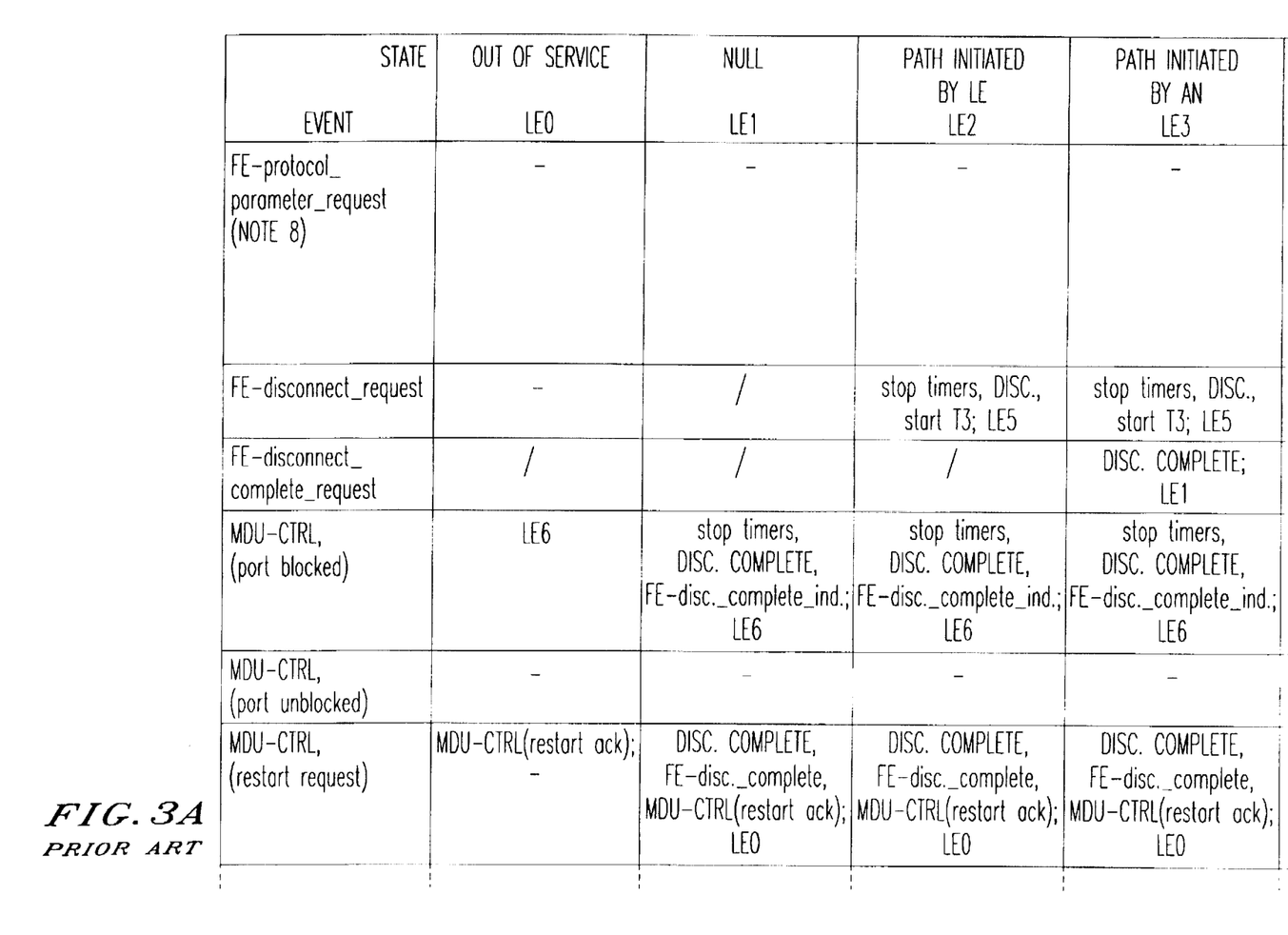
FIG. 3 is a prior art state transition table for an interface circuit operating in a local exchange.
Figure 3B:
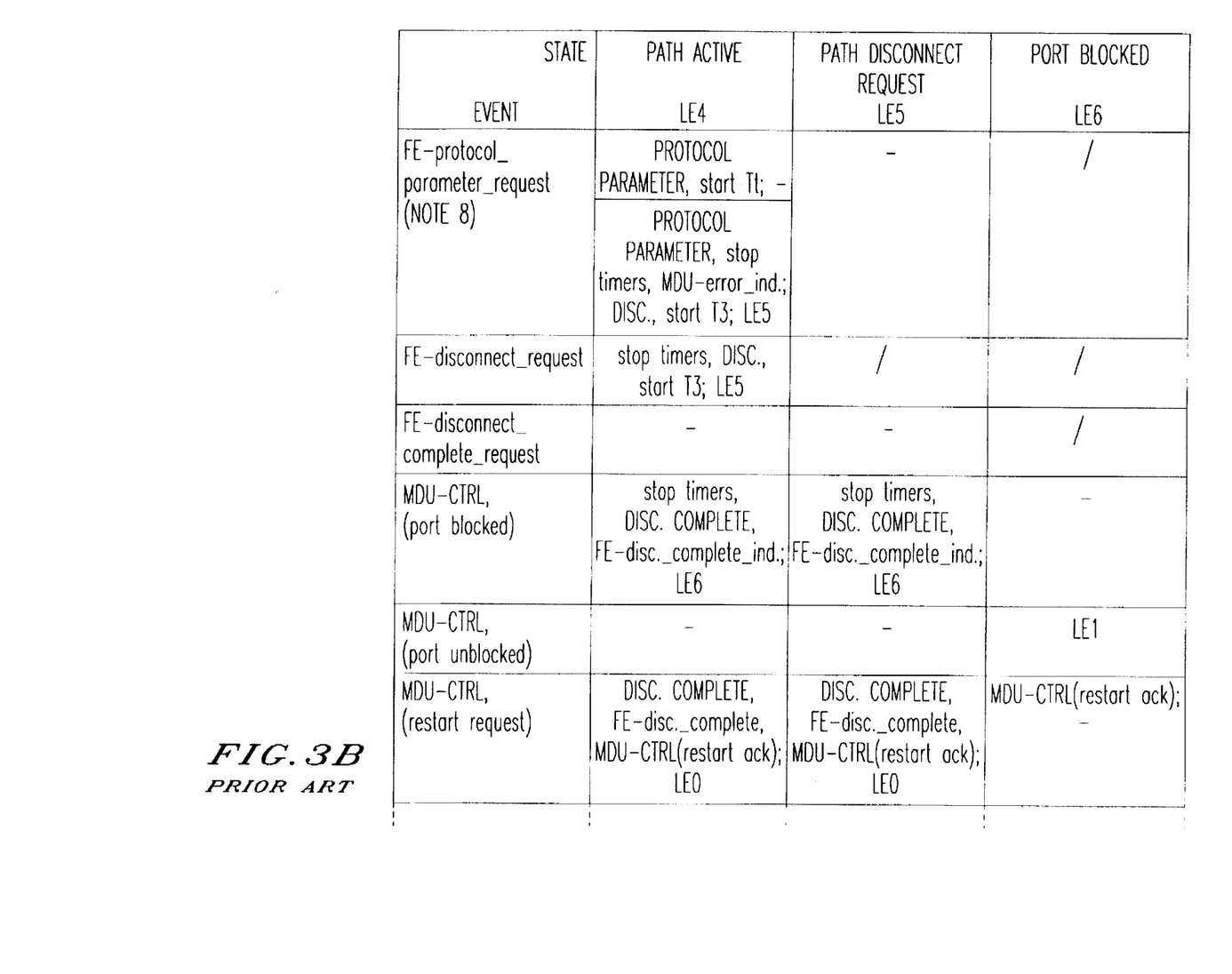
Figure 3C:
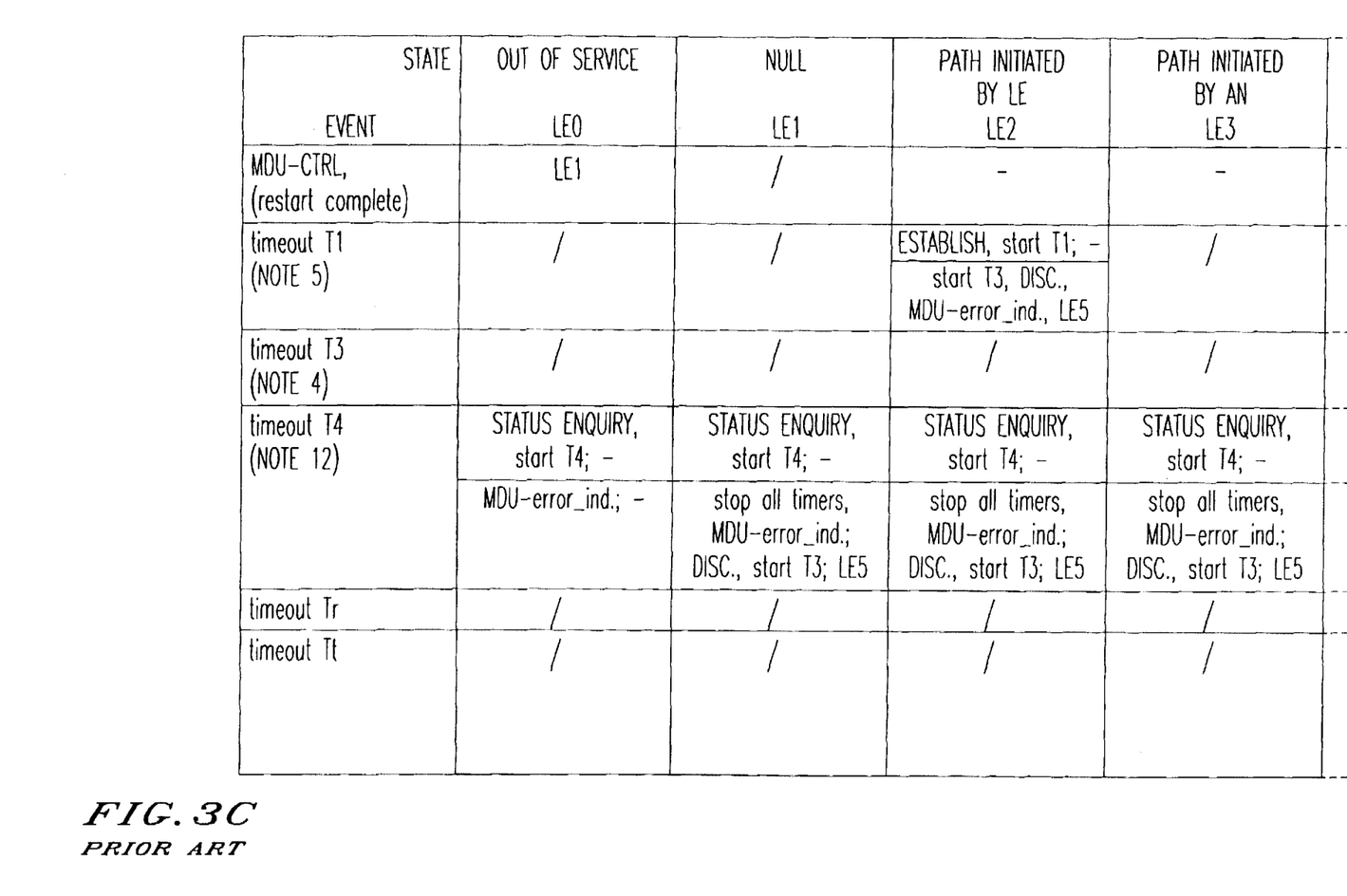
Figure 3D:
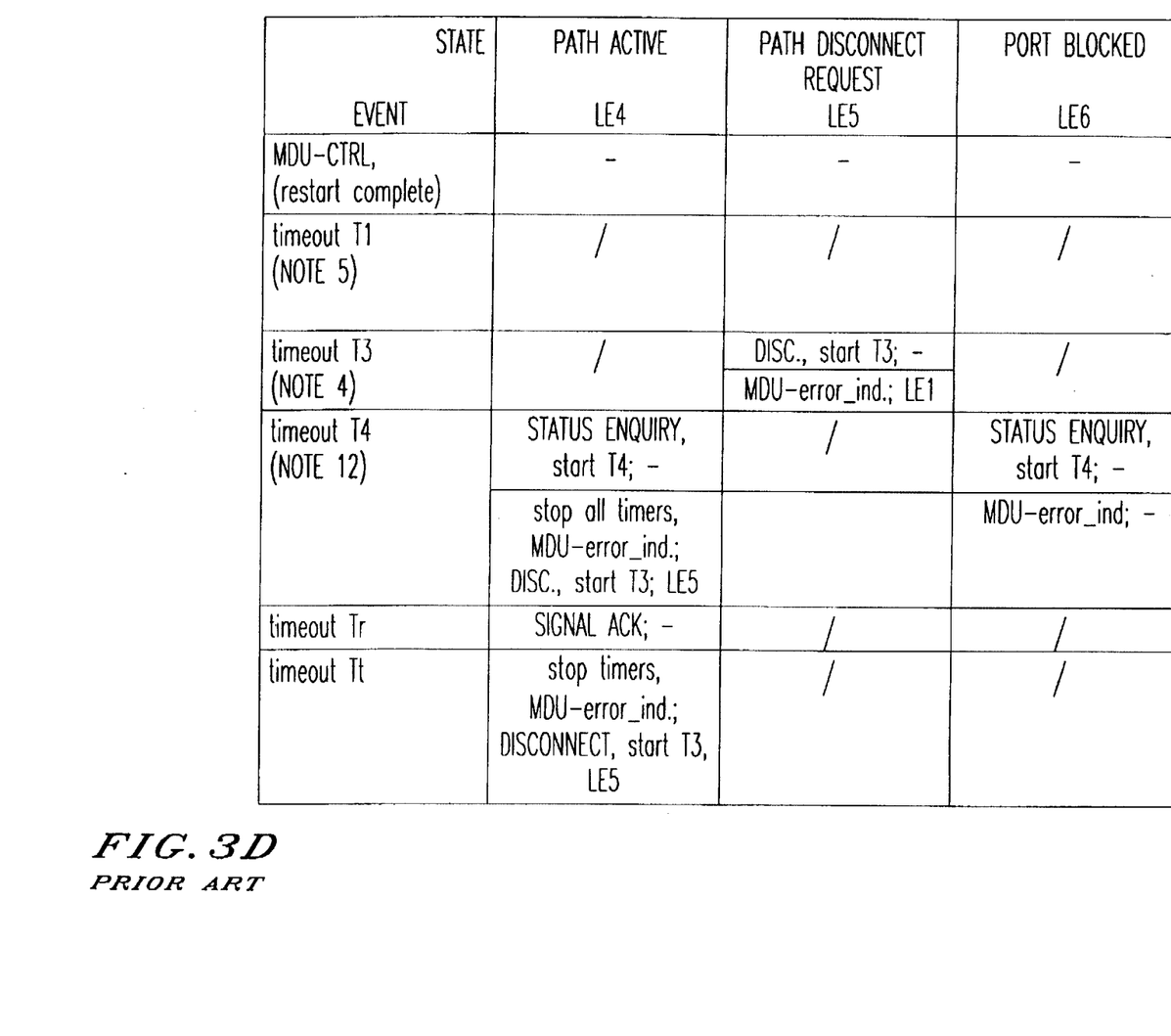

In accordance with the present invention, a software architecture 10 is provided for each shelf, as shown in FIG. 2, and preferably resides in a memory device on the MCU board. The software architecture 10 comprises a layered, distributed operating system 12 which provides communications between shelf components (e.g., between MCU board components, and between the MCU board and the peripheral boards) and with other shelves. The operating system 12 also processes events (e.g., internal events affecting MCU board components and external events arising from the peripheral boards) and dispatches them for processing by program code modules associated with the MCU board, as described in more detail below.

With continued reference to FIG. 2, the operating system 12 preferably dispatches events to interface drivers hereinafter referred to as board managers 14. Board managers are program code modules responsible for maintaining each of the boards in the shelf and for determining which events require processing by higher level software. Upon receipt of an event, for example, the board manager determines whether the event requires processing by an action subroutine manager (ASM) 16 and invokes the ASM. Using the class of service (COS) object 28, the ASM 16 determines which of a number of service group subroutines contains the action subroutine (AS) to be executed to process the event. Service groups are indicated in FIG. 2 as 18a, 18b, 18c, and so on.

Service group number of an element is stored in its class of service, along with a set of flags, timers and other parameters. The parameters, along with the service group, define the features and behavior of a group of ports or subscribers. The software architecture of the present invention provides code-based and table-based service profiles to determine how to process calls for different ports or subscribers, an advantage over existing call processing engines which use a COS table and a single program to decide what processing is to be done next. The single program used in existing call processing engines must therefore take into account all of the different types of ports and subscribers. Multiple types of classes of service can be defined for a particular shelf or group of shelves to accommodate different types of physical ports and subscribers (e.g., analog extensions, analog customer premises equipment (CPE), an X.21 standard CPE).

Further, as will be described in more detail below, multiple instances of each COS-type can be created to distinguish different categories of ports or subscribers of the same type such as a business analog CPE, as opposed to a residential analog CPE.

In accordance with the invention, multiple service groups 18 can exist at one time. Each of the service groups 18 are characterized by program code modules hereinafter referred to as action subroutines (ASs), indicated generally at 20. Service groups 18 define the call processing behavior of each port using software modules, as opposed to the conventional use of bits provided in a large look-up table. ASs realize a number of advantages over conventional call processing control models because they employ embedded, predictive, event-driven programs to create a state machine that is dynamic and not fixed.

ASs 20 are not restricted to high-level feature processing or low-level processing. ASs can be used to implement low-level processes and functions such as a new type of signaling on trunks. If a particular digital trunk interface protocol is implemented in high-level code, the addition of a new type of hardware that uses a similar protocol can be achieved without changing the high-level call processing code. On the other hand, if a driver for a particular hardware device is created, new protocols can be added using ASs 20 for the high-level code and without requiring modification of the hardware drivers or the hardware itself.

ASs 20 are executable objects which run at full machine speed, that is, no run-time interpretation is required to take place. In addition, action subroutines can be located in a random access memory (RAM), or in a read-only memory and then downloaded into a RAM during run-time without interruption of service.

ASs interface to system resources such as distributed processors, hardware interfaces and low-level program code (e.g., board managers) through an application programming interface (API) set. The API set represents a library of routines with which a programmer can design new functions for a system such as a building environment control or telecommunications switching system. A portion of the API set is depicted in FIG. 2 as board managers 14, service objects 22 and service managers 23. The API set allows control and utilization of such capabilities as call detail recording 24, hunt groups and trunk groups 26, COS 28, memory management 30, switching control 32, tone dialing 34, tone decoding 36, timers 38, and others indicated generally at 40 and 42 such as call pick-up groups, addressing, conferencing, fixed databases, and negotiations with other system or peer processors or external host processors. The API set can be expanded when a system requires new features and functions such as high-level processes (e.g., searching databases) or low-level processes (e.g., sending a unique signal to a particular type of interface).

Using object-oriented program code to implement a complex processing environment such as a call processing environment has certain benefits, but also a number of drawbacks. Briefly, the benefits are encapsulation, polymorphism and inheritance. An object written to perform a particular aspect of call processing encapsulates or conceals its internal data structure and program code for implementing that object's actions from other objects. Thus, objects can stimulate other objects into their respective actions via relatively simple object messages. Since knowledge of another object's components is not necessary, the same request or message to different objects can achieve many different results. Finally, classes and subclasses can be defined which affect how objects are related, e.g., what data variables and processing steps are inherited by objects in different subclasses. The inheritance aspect of object-orient coding allows much of the code to be reused when creating objects for new functions. The drawback to object-oriented programming for complex processing systems, however, is that the control programs become fragmented. Thus, complex interactions and relationships become necessary between objects.

To help define these relationships and interactions in a call processing environment, which is continually undergoing development by different research, development and manufacturing groups, a number of organizations such as the European Telecommunications Standards Institute (ETSI) have published state transition tables for certain components such as a local exchange (e.g., a public switched telecommunications network or PSTN), a portion of which is shown in FIG. 3. The column headers represent respective states of PSTN lines or paths, and the row headers represent events. The individual cells representing state/event combinations comprises suggested actions to be undertaken at the PSTN.

In accordance with the invention, ASs 20 and service groups 18 are created to perform these actions, among others (e.g., actions required for new features). Unlike prior processing environments that employ finite state transition tables, however, the embedded processing environment of the present invention reduces the number of states and/or events that have to be added or state/event combinations that have to be modified. Further, the embedded processing environment of the present invention reduces the number of state and event look-up operations the are performed to determined the next required action, as well as the number of COS look-up operations.

The embedded processing environment of the present invention preferably uses distributed processing and storage of data variables relating to each device being controlled in the processing environment. This is in contrast with a number of telecommunications switching devices which have distributed architectures, yet they still are programmed to simulate a centralized switch. These switching devices generally continue to maintain global profile databases, that is, data variables and other information regarding each port and subscriber services. In accordance with the present invention, the ASs 20 are preferably created from the viewpoint of a single subscriber. This means that, even if the same processor is handling both sides of a call, neither party's AS assumes direct access to the other party's data. For example, if a caller wishes to ring a called party, the caller sends a request to the called party to ring itself. The called party analyzes the request and, if the call is accepted, generates its own call record using its call-processing engine. The called party then commands its hardware to generate a ring signal and transmits an acknowledgment signal to the caller. The caller, therefore, is only required to know the location of the called party's call processing engine. The advantage of creating ASs 20 from a single subscriber viewpoint is that program code can span multiple processors or even multiple systems because it is not created on the assumption that a global profile database is accessible by the caller or called party processing engines. Thus, once program code for a new feature is tested for a single node, it can be deployed with minimal effort over a network of several nodes.

The embedded processing environment of the present invention eliminates the need for state/event table look-up operations following each new event because it employs predictive event-driven programming. Existing processing environments which use finite state tables require the processing engine to first perform a search of all of the states in the table, and then a search of all of the events to determine the appropriate action to be taken. Only small state machines with a limited number of events and states can use indexing. Thus, when an event arrives at a call processing engine, the engine is programmed to determine the last state that a particular subscriber entered. The engine subsequently analyzes several pieces of information relating to the profile of the subscriber before executing any required action. As stated previously, each new feature that is added to the program code for that engine introduces new states and profile parameters which must be analyzed in a number of situations and events, thereby increasing the size and complexity of the program code for that engine and the degree of difficulty in modifying existing code.

In contrast, the embedded processing system of the present invention is only event-driven, as opposed to being state and event-driven. New features are added to the program code by providing ASs 20 with independent APIs hereinafter referred to as redirection APIs. The redirection APIs force the call processing engine to direct a future event to another AS other than or in addition to the default AS assigned to that event. The future event is directed to the other AS without requiring the engine to conduct another search of all of the call processing states. If a feature (e.g., an on-hold capability) executes in only a few selected states (e.g., during a simple call), the triggering event for that feature requires processing only in that state. The event is enabled and routed to the appropriate code designed for processing the event before transitioning to that state. In contrast with state and event-driven programming, state transitions in the embedded processing system of the present invention occur as a result of events and searches for the program code to process the events, as opposed to performing two searches for the program code based on states and events.

Three exemplary action subroutines are provided in the Appendix. The first routine entitled AT_ROUTE_$_{LSGS\_}$_TRUNK executes on the caller side to route a call to a called party. The code sends a message to the called party requesting the called party to seize itself and to send a response signal to the caller indicating that it has done so. This is in contrast to existing call processing engines which instructs the called party hardware as to what to do. A CALL_FAIL event can be generated at any time during the course of a call if the call processing engine or an AS fails to process the call. In the initial AS (i.e., AT_ROUTE_LSGS_TRUNK), the AS provides an instruction for the call processing engine to redirect the next potential call failed event to an AS entitled AT_RLS_MATE in addition to the default AS entitled AT_CALL_FAILED. Thus, the events are embedded in the program code in a predictive manner to invoke different action subroutines, thereby eliminating the need to perform another state search for the next state.

Figure 4:
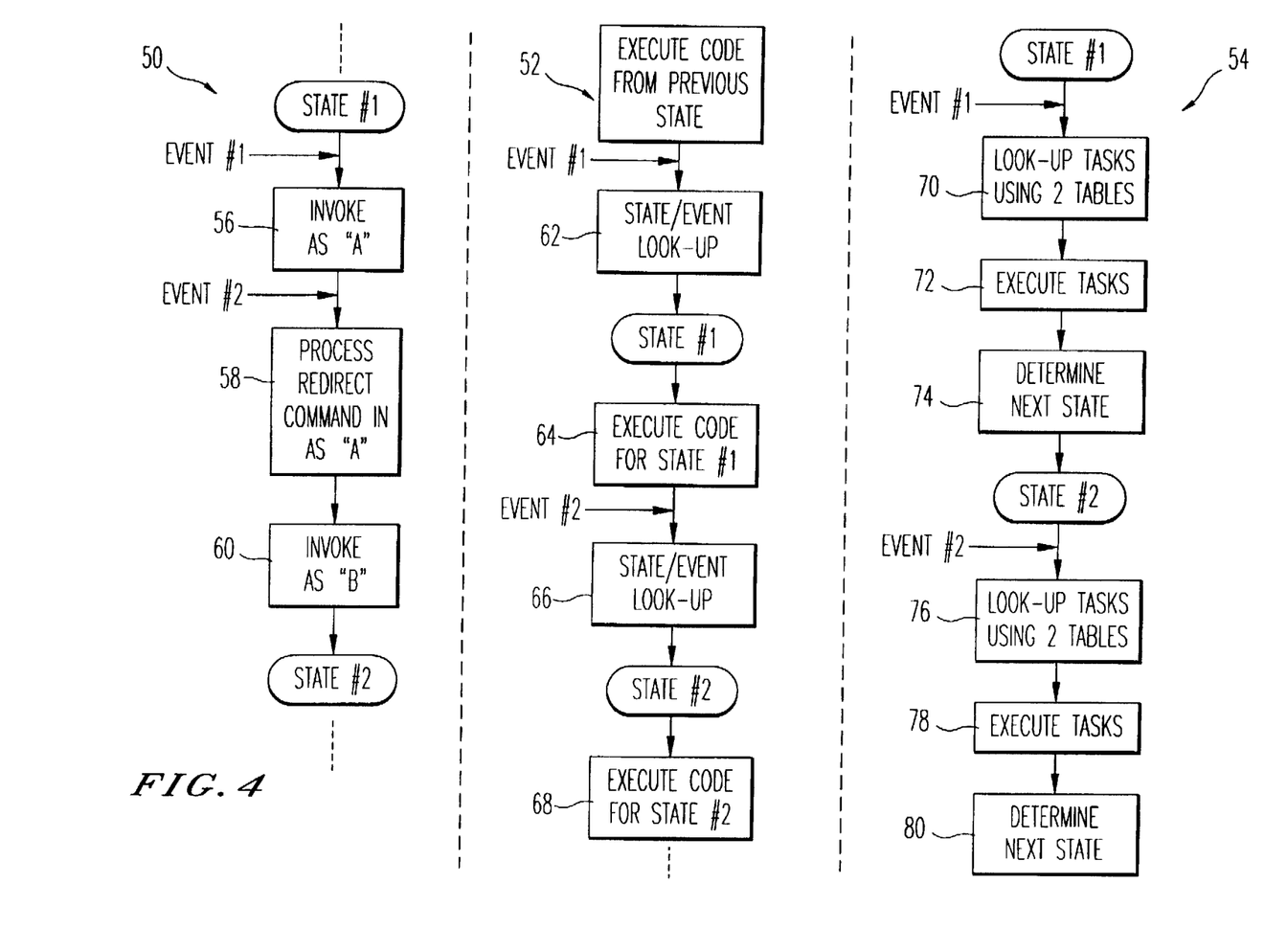
FIG. 4 is a flow chart depicting a sequence of operations for invoking subroutines in an event-driven, dynamic state machine in accordance with an embodiment of the present invention, as compared with two conventional table-based fixed state machines.

A comparison of the embedded programming environment of the present invention 50 with two conventional, state-driven, finite state machines 52 and 54 is provided in FIG. 4. In accordance with the present invention, a first action subroutine "AA" is invoked upon the occurrence of event #1 (block 56). The action subroutine "A" comprises a redirect command to accommodate a particular event (i.e., event #2). As stated previously, action subroutines can be provided with one or more redirection APIs to force the call processing engine to execute ASs other than or in addition to the default AS when a special event is generated. These redirect APIs therefore allow the ASs to be predictive. Upon the occurrence of another event #2, the processing engine (block 58) invokes a second action subroutine "B" without having to do a state search to process the event #2 (block 60).

A processor operable in accordance with a finite state machine, in contrast, locates the code for processing the event/state combination 1 corresponding to the present state and the event #1 (block 62) and executes the code (block 64). The processing engine subsequently performs a search to determine which state it is in, upon receipt of a second event (block 66). The event/state combination corresponding to the second state #2 and the event #2 is then used to locate the necessary program code (block 68). Similarly, the table-based state machine disclosed in the aforementioned U.S. Pat. No. 5,386,464 must also perform state searches upon receipt of each event. The processor consults two tables (blocks 70 and 76) to determine tasks that are to be performed (blocks 72 and 78) for a particular event/state combination. The processor then consults a third table (blocks 74 and 80) to determine the next state. Thus, both of these state machines are state and event-driven, as opposed to being only event-driven.

The predictive event-driven programming environment of the present invention is also advantageous because it allows service profiles for different subscribers in a telecommunications system, for example, to be code-based and table-based, as opposed to being only table-based. For example, an off-hook on a normal telephone precipitates a dial tone. On the other hand, an off-hook on an emergency telephone results in an immediate ring at an emergency station via a hot-line, for example. In a conventional, state-driven, table-based programming environment, both normal operation and emergency operation features need to be coded when developing program code for an off-hook event. During table look-up operations, a class of service library must be consulted to determine class of service for that subscriber (e.g., hot-line or normal connection) and the type of call processing required next. In accordance with the present invention, however, an action subroutine can be created for normal off-hook call processing without regard for the hot-line case since an off-hook event from an emergency telephone is directed to a different program code module. Although the need for class of service table look-up operations is reduced, they are nevertheless available as a service object 28.

While certain advantageous embodiments have been chosen to illustrate the invention, it will be understood by those skilled in the art that various changes and modifications can be made herein without departing from the scope of the invention as defined in the appended claims.

APPENDIX

```
//------------------------------------
//EVENT: RING_EVENT_LSGS_TRUNK
//TREE ID: AT_ROUTE_LSGS_TRUNK
//PURPOSE: Routes this caller to an LSGS Trunk.
//DATA EXPECTED: MSG must point to a structure of type FindDestSt.
int RouteLSGSTrunk(PortEventHandler *self)
{
    SeizeSelfRespParams timeOut;
    FindDestSt    *pFD;
    Tele_ClearDecoders( );
    AdjustBarEvent(DGCX, ATRT_TEMP);
    //Normal Call Application does not need DGCX any more
    AdjustBarEvent(DGEX, ATRT_TEMP);
    //Normal Call Application does not need DGEX any more
    pFD = (FindDestSt*)MSG;
    LogEventParatmeter(pFD→m_bySearchRes);
    mateSoul = pFD→m_soul;
    //save the LS trunk as my mate
    if (!MateSave(CS_CALL_INITIATED))
    {
        FakeEvent(CALL_FAILED, NULL);
        return !ERR_OK;
    }
    timeOut.m_status = SSR_FAILED;
    XmitMateEvent(SEIZE_SELF, 0, NULL,
    SEIZE_SELF_RESP, sizeof(timeOut), &timeO
    RedirectSelfEvent(CALL_FAILED, AT_RLS_MATE,
    CHAINEDIATRT_ONCE_TEMP);
    SetStatus(PS_RING_REQUEST);
    return ERR_OK;
}
//------------------------------------
//EVENT: CALL_FAILED
//TREE ID: AT_RLS_MATE
//PURPOSE: Release my mate when the call cannot be finished.
//
//DATA EXPECTED: None
int ReleaseMate(PortEventHandler *self)
{
    // get my mate regardless of the call status
    if (MateGet(curCallStatus, callNum, SET_GLOBAL_DATA))
    {
        Bill_StopCharging( );
        Tele_Disconnect(ONE_WAY);
        XmitMateEvent(MATE_ONHX, 0, NULL,
        NO_RESP_REQUIRED, 0, NULL, 0);
        MateFree(curCallStatus, callNum);
        return ERR_OK;
    }
    return !ERR_OK;
}
//------------------------------------
//EVENT: CALL_FAILED
//TREE ID: AT_CALL_FAILED
//SERVICE GROUP: SG_EXT
//PURPOSE: Cleans up a call when the call cannot be finished.
//DATA EXPECTED: None
int CallFailed(PortEventHandler *self)
{
    Tele_ClearDecoders( );
    Tele_Tone(Congestion_tone);
    Timer(myType, myCOS, CP_CONGESTION_TONE_TIMER, timerNum);
    SetStatus(PS_RECEIVING_CONGESTION);
    return !ERR_OK-
}
```

What is claimed is:

1. A control system for controlling a number of independent elements characterized by a plurality of states and events, comprising:

a processor; and software stored in a machine-readable memory device comprising:

a plurality of element interface modules programmed to detect events created by respective ones of said independent elements, said plurality of element interface modules also programmed to report said events to said processor;

a plurality of service groups, said plurality of service groups each comprising at least one action subroutine, said action subroutine defining the behavior of at least one of said independent elements and the processing to be performed for corresponding said events and states;

an action subroutine manager programmed to invoke at least one of said service groups upon receipt of one of said events based on a service class; and a dispatcher for dispatching said events from said processor to at least one of said plurality of element interface modules and said action subroutine manager, said plurality of element interface modules programmed to receive events from said dispatcher and to selectively invoke said action subroutine manager to process at least one of said events.

2. A control system as claimed in claim 1, further comprising an application programming interface set of program code modules in said memory devices said action subroutine manager programmed to invoke at least one of said program code modules to process one of said events.

3. A control system as claimed in claim 1, wherein said control system is a telecommunications switching platform, said element interface modules being configured to interface with communication links selected from the group consisting of an analog line, a digital line, and a trunk.

4. A control system as claimed in claim 3, said memory device further comprising an application programming interface set of program code modules selected from the group consisting of switching control, tone dialing, tone decoding, timer operations, call detail recording, and class of service library functions, said action subroutine manager programmed to invoke at least one of said program code modules to process one of said events.

5. A control system as claimed in claim 3, wherein said at least one action subroutine if each of said plurality of service groups are created to define call processing behavior of each of a plurality of ports corresponding to said communication links.

6. A control system as claimed in claim 5, wherein said at least one action subroutine corresponding to one of said plurality of service groups is employed in other ones of said plurality of service groups.

7. A method of controlling a number of elements in a control system, the elements being characterized by a number of events and states, said methods comprising the steps of:

detecting a first event from one of said elements while operating in a first state;

invoking a first action subroutine to process said first event;

detecting a second event;

determining from said first action subroutine the location of second action subroutine for transitioning from said first state to a second state precipitated by said second event; and invoking said second action subroutine to process said second event without first determining which of said states said control system is in following execution of said first action subroutine.

8. A method of implementing a predictive, event-driven state machine for controlling a number of elements characterized by a number of events and states, comprising the steps of:

defining the behavior of each of said elements, and defining processing to be implemented to transition to a second state from a first state and a first event;

creating a first action subroutine for performing said processing corresponding to said first state and said first event; and inserting a redirection application programming interface into said first action subroutine to transition from said first state to said second state upon the occurrence of a second event.

9. A methods as claimed in claim 8, wherein said element operates in said second state in accordance with a second action subroutine that is linked to said first action subroutine by said redirection application programming interface.

10. A method as claimed in claim 9, wherein said element is desired to operate in accordance with another combination of one of said states and one of said events, further comprising the step of inserting a second redirection application programming interface into said first action subroutine to transition to a third state upon the occurrence of a third event.

11. A method as claimed in claim 10, wherein said element operates in said third state in accordance with a third action subroutine that is linked to said first action subroutine by said second redirection application programming interface.

\* \* \* \* \*

UNITED STATES PATENT AND TRADEMARK OFFICE
CERTIFICATE OF CORRECTION

PATENT NO. : 5,778,059
DATED : July 7, 1998
INVENTOR(S) : Masoud Loghmani, Steven Davis and Brian Bolon It is certified that error appears in the above-identified patent and that said Letters Patent is hereby corrected as shown below:

Column 9, line 43, change "if" to --of--.

Signed and Sealed this

Twenty-seventh Day of October, 1998

Attest:

BRUCE LEHMAN

*Attesting Officer*    *Commissioner of Patents and Trademarks*